(12) United States Patent
Yogou et al.

(10) Patent No.: US 9,193,216 B2
(45) Date of Patent: Nov. 24, 2015

(54) PNEUMATIC TIRE

(75) Inventors: Hayato Yogou, Osaka (JP); Akihiko Shinkai, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 578 days.

(21) Appl. No.: 12/920,364

(22) PCT Filed: Feb. 25, 2010

(86) PCT No.: PCT/JP2010/052976
§ 371 (c)(1),
(2), (4) Date: Aug. 31, 2010

(87) PCT Pub. No.: WO2010/122840
PCT Pub. Date: Oct. 28, 2010

(65) Prior Publication Data
US 2011/0048600 A1    Mar. 3, 2011

(30) Foreign Application Priority Data
May 29, 2009    (JP) .................................. 2009-131336

(51) Int. Cl.
*B60C 11/00*    (2006.01)

(52) U.S. Cl.
CPC .............. *B60C 11/00* (2013.01); *B60C 11/0058* (2013.04); *B60C 11/0066* (2013.04); *B60C 2011/0025* (2013.04); *B60C 2011/0388* (2013.04)

(58) Field of Classification Search
CPC ............ B60C 11/00; B60C 2011/0388; B60C 11/0058; B60C 11/0066; B60C 11/0041; B60C 11/0008; B60C 2011/0025; B60C 2011/0016
USPC ..................................................... 152/209.5

IPC ......................................................... B60C 11/00
See application file for complete search history.

(56) References Cited

U.S. PATENT DOCUMENTS 5,942,069 A *    8/1999    Gerresheim et al. ........ 156/128.1
6,523,585 B1 *    2/2003    Ducci et al. ................ 152/152.1
(Continued)

FOREIGN PATENT DOCUMENTS

CN    101115633    1/2008
EP    1184205 A2 *    3/2002    .............. B60C 11/00
(Continued)

OTHER PUBLICATIONS

UBE America Inc., Rubber UBEPOL-BR, 2013.*
(Continued)

*Primary Examiner* — Justin Fischer
*Assistant Examiner* — Philip N Schwartz
(74) *Attorney, Agent, or Firm* — Fish & Richardson P.C.

(57) ABSTRACT

A pneumatic tire has a center rib extending along a tire circumferential direction in a center portion of a tread surface. A width of the center rib is equal to or more than 10% of a grounding width. An outside rubber having a relatively high tension modulus is arranged outside a vehicle and an inside rubber having a relatively low tension modulus is arranged inside the vehicle, by setting an interface formed in the center rib along a tire diametrical direction to a boundary. 300% tension modulus Mo and a rubber hardness Ho of the outside rubber, and 300% tension modulus Mi and a rubber hardness Hi of the inside rubber satisfy the following relationship:

$(Mo-Mi)/Mo \geq 0.15$ $Ho-Hi \leq \pm 3$ degree.

6 Claims, 4 Drawing Sheets

(56) References Cited

U.S. PATENT DOCUMENTS

| | | |
|---|---|---|
| 2002/0033212 A1 | 3/2002 | Caretta et al. |
| 2003/0135006 A1* | 7/2003 | Materne et al. ............ 528/10 |
| 2004/0261926 A1* | 12/2004 | Ozel et al. ............ 152/209.5 |
| 2005/0076984 A1* | 4/2005 | Park et al. ............ 152/209.5 |
| 2007/0175557 A1 | 8/2007 | Puhala et al. |
| 2009/0008014 A1 | 1/2009 | Segawa et al. |

FOREIGN PATENT DOCUMENTS

| | | | |
|---|---|---|---|
| EP | 1619048 A1 | 1/2006 | |
| EP | 1867497 A1 | 12/2007 | |
| JP | 02-185802 | 7/1990 | |
| JP | 04-185507 | 7/1992 | |
| JP | 2728286 B2 * | 3/1998 | ............ B60C 9/08 |
| JP | 11139107 A * | 5/1999 | ............ B60C 1/00 |
| JP | 2912437 B2 * | 6/1999 | ............ B60C 11/00 |
| JP | 11321237 A | 11/1999 | |
| JP | 2002-114008 | 4/2002 | |
| JP | 2002-532330 | 10/2002 | |
| JP | 2003-326917 | 11/2003 | |
| JP | 2006240592 A * | 9/2006 | ............ B60C 11/04 |
| JP | 2006-327255 | 12/2006 | |

OTHER PUBLICATIONS

Machine translation of JP 2912437 B2 (no date).*
Supplementary European Search Report for Appln No. 10765355.2 dated May 27, 2011, 4 pages.
Form PCT/IB/373 International Preliminary Report on Patentability for International Application No. PCT/JP2010/052976 dated Dec. 12, 2011.
Form PCT/ISA/237 Written Opinion for Application No. PCT/JP2010/052976 dated Dec. 12, 2011.
Office Action for Chinese Patent Application No. 201080001522.3 dated Nov. 29, 2012.

* cited by examiner

PNEUMATIC TIRE

TECHNICAL FIELD

The present invention relates to a pneumatic tire which is provided with a center rib extending along a tire circumferential direction in a center portion of a tread surface.

BACKGROUND ART

In the pneumatic tire having the center rib mentioned above, since a rigidity of the center portion of the tread surface is enhanced, there is a tendency that a travel motion becomes stable under such a condition that a severity (a travel severity) is low, and a steering stability at a time of changing lane from a rectilinear travel (hereinafter, refer to as "lane change stability") is improved. On the other hand, if the center rib is made wide so as to make the rigidity too high, a grounding property with respect to a road surface is deteriorated under such a condition that the severity is high, for example, at a marginal cornering time, a braking time and the like, whereby a sufficient grip cannot be obtained. Accordingly, the steering stability at a time of cornering (hereinafter, refer to as "cornering stability") and a braking performance are deteriorated.

In brief, there is a tendency that if the center rib is made narrow, the lane change stability is lowered, and if the center rib is made wide, the cornering stability and the braking performance are lowered, and both are in an incompatible relationship with regard to the width of the center rib. In general, in a tire having a wide grounding width or a tire having a low flattening, since the center rib tends to become wide from a relative relationship to the other region of the tread surface, there is fear that the cornering stability and the braking performance are deteriorated. On the contrary, there can be considered such a countermeasure for making the center rib low in its rigidity by segmenting with a narrow groove or a sipe or using a soft rubber compounding. However, in that case, the lane change stability is deteriorated.

In a pneumatic tire described in the following Patent document 1, a tread band is separated into two sections in a tire width direction, an elastic modulus of a rubber outside a vehicle is set to 12 to 16 MPa, and an elastic modulus of a rubber inside the vehicle is set to 7 to 11 Mpa. However, this is for the purpose of enhancing a steering stability at a time of cornering on a dry road surface by the rubber outside the vehicle, and enhancing a ride comfort and a steering stability on a wet road surface by the rubber inside the vehicle. In other words, in the tire, it is planned to make an outer side of the vehicle hard, and make an inner side of the vehicle soft, and the rubbers having the different elastic modulus (storage modulus E') are used only for achieving it. Accordingly, in an actual tire, the rubber having a high hardness is arranged outside the vehicle, and the rubber having a low hardness is arranged inside the vehicle, necessarily (refer to Tables 1 and 2 of the patent document 1).

In order to make the lane change stability, and the cornering stability and the braking performance compatible, it is important to improve the grounding property of the center rib in the condition that the severity is high, while maintaining the rigidity of the center rib, however, Patent document 1 does not teach any solving means for this at all. Even if the center rib is provided in the center portion of the tread surface and an interface of the rubbers having the different elastic modulus is formed at a center position of the center rib, in the tire mentioned above, a difference of the rubber hardness is large between the outside of the vehicle and the inside of the vehicle, and a rigidity fluctuation is generated in the center rib. Therefore, there is a risk that the lane change stability is lowered, and the incompatible phenomenon mentioned above can not be solved.

PRIOR ART DOCUMENT

Patent Document

Patent Document 1: Japanese National Publication of Translated Version No. 2002-532330

DISCLOSURE OF THE INVENTION

Problems to be Solved by the Invention

The present invention is made by taking the actual condition mentioned above into consideration, and an object of the present invention is to provide a pneumatic tire which can achieve an excellent cornering stability and a braking performance while securing a lane change stability.

Means for Solving the Problems

The inventors of the present invention pays attention to a fact that a force heading for a center portion (an in-plane contractive force) acts on a grounding surface of a tire, and a center rib is less deflected and is hard to be distorted. Further, devoting themselves to make a study, they have found that a region having a particularly small strain is formed in the center rib along a tire diametrical direction, and the strain in a grounding surface side of the center rib can be prompted by forming an interface of rubbers having different tension modulus (JISK6200 01) in the region having the small strain. The present invention is made on the basis of the knowledge mentioned above, and can achieve the object mentioned above, with the following structure.

That is, the present invention provides a pneumatic tire comprising a center rib extending along a tire circumferential direction in a center portion of a tread surface, wherein a width of the center rib is equal to or more than 10% of a grounding width, an outside rubber having a relatively high tension modulus is arranged outside a vehicle and an inside rubber having a relatively low tension modulus is arranged inside the vehicle, by setting an interface formed in the center rib along a tire diametrical direction to a boundary, and wherein 300% tension modulus Mo and a rubber hardness Ho of the outside rubber, and 300% tension modulus Mi and a rubber hardness Hi of the inside rubber satisfy the following relationship:

$(Mo-Mi)/Mo \geq 0.15$ $Ho-Hi \leq \pm 3$ degree.

In the present invention, since the width of the center rib is equal to or more than 10% of the grounding width, the center rib becomes moderately wide so as to be advantageous for securing the lane change stability. Further, since the rubbers having the different tension modulus are arranged by setting the interface formed in the center rib to the boundary, it is possible to obtain a sufficient grip by prompting the strain in the grounding surface side of the center rib, and improving the grounding property of the center rib at the marginal cornering time and the braking time. In order to securely achieve the strain prompting action mentioned above, a tension modulus difference (Mo−Mi) between the outside rubber and the inside rubber is set to be equal to or more than 15% of the 300% tension modulus Mo of the outside rubber. Further, in the present invention, in spite of a positive provision of the tension modulus difference as mentioned above, a hardness difference (Ho−Hi) between the outside rubber and the inside rubber is set within ±3 degree, and a rigidity fluctuation of the center rib is suppressed. As a result, it is possible to achieve excellent cornering stability and braking performance while securing a lane change stability.

The grounding width is a distance between the outermost positions in a tire axial direction in the center portion in the circumferential direction of the grounding surface, at a time of filling a normal internal pressure in the tire installed to a normal rim so as to place on a flat road surface, and applying a load corresponding to 88% of a maximum load capacity of the tire. The normal rim is a rim which is determined per tire by a standard system including a standard on which the tire is based, for example, is a standard rim in JATMA, "Design Rim" in TRA, or "Measuring Rim" in ETRTO. Further, the normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO.

In the present invention, it is preferable that a center position of the center rib is included in an interface region of the center rib. Since the region having the small strain in the center rib tends to be particularly formed at the center position of the center rib, it is possible to accurately achieve the strain prompting action with respect to the center rib by setting the interface region as mentioned above, whereby it is possible to effectively improve the cornering stability and the braking performance.

In the present invention, it is preferable that a width of an interface region of the center rib is equal to or more than 25% of a width of the center rib. According to the structure mentioned above, since it is possible to secure the bonding region of the interface so as to prevent a crack or the like in the interface, while maintaining the strain prompting action with respect to the center rib, it becomes advantageous for securing the durability.

BEST MODE FOR CARRYING OUT THE INVENTION

Figure 1:
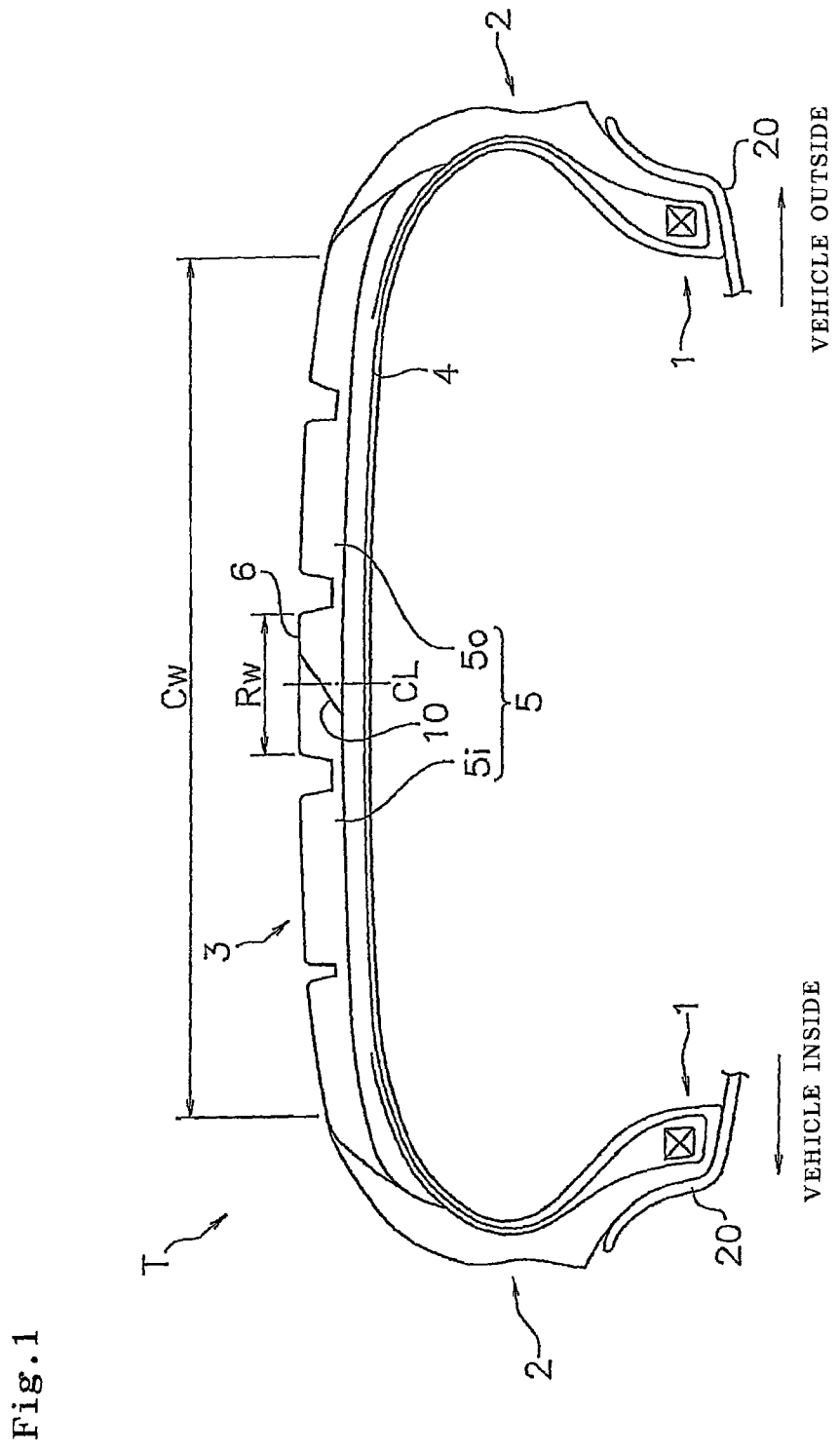
FIG. 1 is a sectional view of a tire meridian showing one example of a pneumatic tire according to the present invention.
Figure 2:
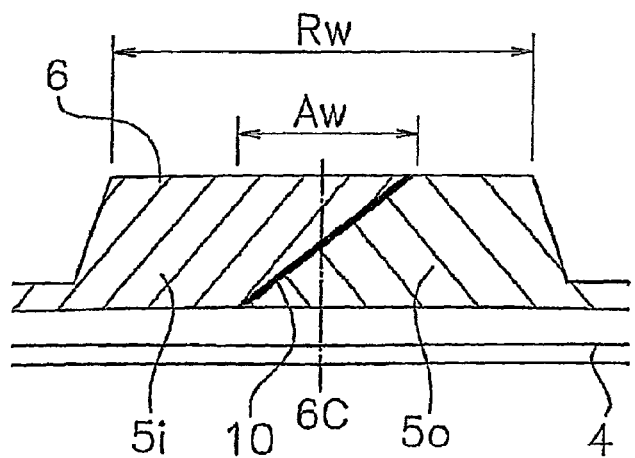
FIG. 2 is an enlarged view showing a substantial part of FIG. 1.

An embodiment of the present invention will be explained with reference to the drawings. FIG. 1 is a sectional view of a tire meridian showing one example of a pneumatic tire according to the present invention, and FIG. 2 is an enlarged view showing a substantial part of that. The pneumatic tire T comprises a pair of bead portions 1, side wall portions 2 extending from the bead portions 1 to outer side in a tire diametrical direction, and a tread portion 3 connected to outer ends in a tire diametrical direction of the side wall portions 2. The tire T is an installing direction designated type tire, and is structured such as to designate which of right and left tires faces an outer side of a vehicle, at a time of being installed to a rim 20.

A carcass layer 4 includes a ply which is interlinked between a pair of bead portions 1, and a tread rubber 5 is arranged in an outer periphery of the tread portion 3. The pneumatic tire T has the same tire structure as that of the conventional one except a structure of the tread rubber 5 which will be in detailed described below, and the material, the shape and the like which have been known conventionally can be employed in the present invention without any particular limitation. Although an illustration is omitted, a belt layer including two belt plies which are laminated inside and outside is laminated in an outer periphery of the carcass layer 4, in the tread portion 3, and a belt reinforcing layer is further laminated in an outer periphery thereof.

A center portion of the tread surface is provided with a center rib 6 extending along a tire circumferential direction. The center rib 6 is provided in a region which is 10% of a grounding width Cw in both right and left sides (totally 20%) on the basis of a tire equator line CL. A width Rw of the center rib 6 is set to be equal to or more than 10% of the grounding width Cw. Accordingly, the center rib 6 becomes moderately wide, thereby becoming advantageous for securing a lane change stability. This rib width Rw is measured in the grounding surface in the same measuring condition as that of the grounding width Cw, and is equal to or less than 20% of the grounding width Cw at most.

The tread rubber 5 includes two kinds of rubbers 5o and 5i having different tension modulus, and has a structure which is divided in a tire width direction. An interface 10 forming a division surface is formed in the center rib 6 along a tire diametrical direction, the outside rubber 5o having a relatively high tension modulus is arranged outside the vehicle, and the inside rubber 5i having a relatively low tension modulus is arranged inside the vehicle, by setting the interface 10 to a boundary. In other words, a tension modulus Mo of the outside rubber 5o and a tension modulus Mi of the inside rubber 5i satisfy a relationship Mo>Mi, and this fact is advantageous for securing a cornering stability.

In the present invention, the tension modulus Mo and Mi are set in such a manner as to satisfy a relationship (Mo−Mi)/Mo≥0.15, and a rubber hardness Ho of the outside rubber 5o and a rubber hardness Hi of the inside rubber 5i are set in such a manner as to satisfy a relationship Ho−Hi≤±3 degree. The tension modulus Mo and Mi are 300% tension modulus which is measured at 25° C. according to JISK6251, and the rubber hardness Ho and Hi are a rubber hardness which is measured at 25° C. by a durometer hardness tester (type A) of JISK6253.

Figure 3:
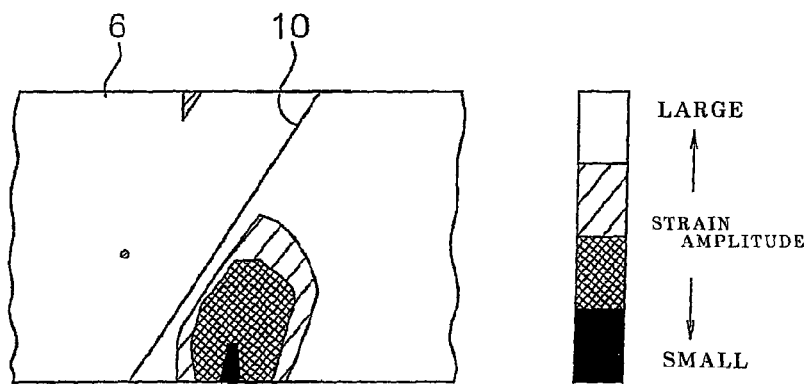
FIG. 3 is a contour view conceptually showing a distribution of a strain in a cross section of a center rib.

It is possible to prompt a strain in the grounding surface side of the center rib 6 as shown in FIG. 3 at a time of grounding, by setting the interface 10 in the center rib 6. On the contrary, in the case where the center rib 6 includes a single layer of the outside rubber 5o (FIG. 4), and in the case where it includes a single layer of the inside rubber 5i (FIG. 5), a region which is hard to be distorted is formed along a tire diametrical direction. In other words, in the case where the region in which the strain becomes small in the center rib of the single layer forms the interface 10 of the rubbers having the different tension modulus, the strain is prompted in the grounding surface side of the center rib 6 as shown in FIG. 3.

Figure 4:
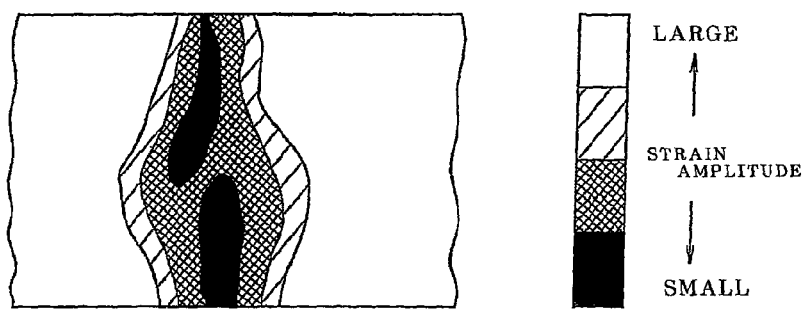
FIG. 4 is a contour view of a strain distribution in a single layered center rib which is shown for comparing with the present invention.
Figure 5:
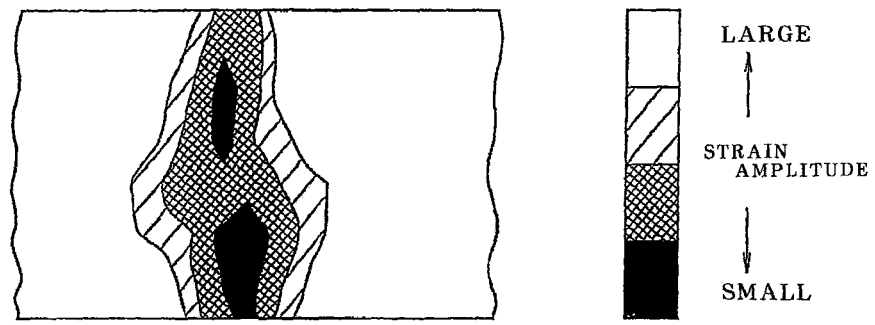
FIG. 5 is a contour view of a strain distribution in a single layered center rib which is shown for comparing with the present invention.

Here, FIGS. 3 to 5 are contour views of a strain amplitude in the cross section of the center rib, and mean that the strain amplitude is large in a pale region, and the strain is prompted. In this case, this strain amplitude is an amplitude of a shear strain in "back and forth-width direction" in a total coordinate system, and this "back and forth-width direction" coincides with "circumferential-meridian direction" in a local coordinate system on a tire body. An amplitude of a strain acting on the center portion of the center rib 6 of the tire T is approximately equal to or less than 2%, however, in such a region that the strain amplitude is small (less than about 3%), there is a tendency that tan δ (a loss factor) becomes generally larger according to an enlargement of the strain amplitude (for example, refer to FIG. 4.15 (b) in page 84 of "New Edition Base of Rubber Technique" issued by Society of Rubber Industry, Japan). Accordingly, it is possible to enhance a grip by prompting the strain.

Therefore, in the tire T, since a sufficient grip can be obtained by prompting the strain in the grounding surface side of the center rib 6 and improving the grounding property, at the marginal cornering time and the braking time, it is possible to achieve the excellent cornering stability and braking performance. In the present invention, in order to securely generate the strain prompting action mentioned above, the tension modulus difference (Mo−Mi) between the outside rubber 5o and the inside rubber 5i is set to be equal to or more than 15% of the tension modulus Mo of the outside rubber 5o, and it is further preferable if it is equal to or more than 25%. If the tension modulus difference (Mo−Mi) is less than 15% of the tension modulus Mo, the strain is not moderately prompted in the center rib 6, and the improving effect mentioned above is hard to be sufficiently obtained.

As mentioned above, since the outside rubber 5o and the inside rubber 5i are provided with the tension modulus difference which is equal to or more than a predetermined level, even if the rib width Rw is set to be equal to or more than 10% of the grounding width Cw, this setting is not sufficient for securing the lane change stability. Accordingly, in the present invention, the hardness difference (Ho−Hi) is set within ±3 degree while positively setting the tension modulus difference with respect to the outside rubber 5o and the inside rubber 5i, thereby suppressing the rigidity fluctuation of the center rib 6. As a result, it is possible to achieve excellent cornering stability and braking performance while securing a lane change stability.

The region having the small strain as shown in FIGS. 4 and 5 tends to be formed in the vicinity of the center position 6C of the center rib 6. Accordingly, it is preferable that the center position 6C is included in the interface region of the center rib 6. The interface region is a region which is from an outer peripheral end of the interface 10 in the center rib 6 to an inner peripheral end thereof, and is a region having a width Aw shown in FIG. 2. Further, it is preferable that the tire equator CL is included in the interface region.

Even in the case where the interface 10 is formed in parallel to the tire diametrical direction, the strain prompting action of the center rib 6 can be obtained, however, since there is fear that a durability in the vicinity of the interface 10 is deteriorated in that case, it is preferable to make the width Aw of the interface region of the center rib 6 equal to or more than 25% of the rib width Rw so as to secure the bonding region of the interface 10. In this case, since a spread in the width direction of the region which is hard to be distorted is limited in the center rib 6, it is preferable that the width Aw is equal to or less than 75% of the rib width Rw.

In the present embodiment, since the interface 10 is inclined with respect to the tire diametrical direction and extends linearly, it is possible to moderately secure the width Aw of the interface region, and it is possible to more securely prompt the strain in the grounding surface side of the center rib 6. Above and below the interface 10, the inside rubber 5i is arranged in the grounding surface side, however, the outside rubber 5o may be arranged in the grounding surface side by inverting the direction of slope of the interface 10, and the same effect can be obtained even in that case.

The tension modulus Mo of the outside rubber 5o is, for example, between 10 and 20 MPa, and the tension modulus Mi of the inside rubber 5i is, for example, between 5 and 15 MPa. Further, it is preferable that each of the rubber hardness Ho of the outside rubber 5o and the rubber hardness Hi of the inside rubber 5i is between 70 and 80 degree, for securing the lane change stability.

The present invention is not limited to the embodiment mentioned above, but can be variously modified and changed within the scope of the present invention. The tread pattern included in the pneumatic tire according to the present invention is not particularly limited as long as the center rib is provided as mentioned above, but may be any of a symmetrical pattern or an asymmetrical pattern.

Since even in the case where the center rib becomes wide for a design reason or the like, the pneumatic tire according to the present invention can generate the operation and effect as mentioned above so as to cope therewith, it is particularly useful in the tire having a low flattening.

[other embodiment]

Figure 6:
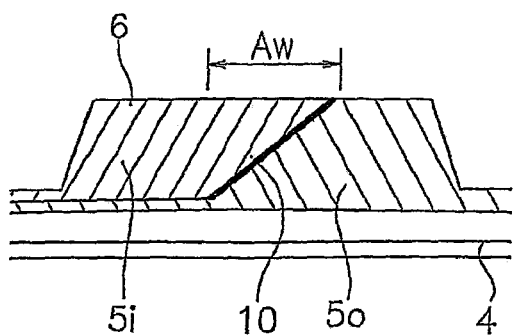
FIG. 6 is a cross sectional view of a center rib according to the other embodiment of the present invention.
Figure 7:
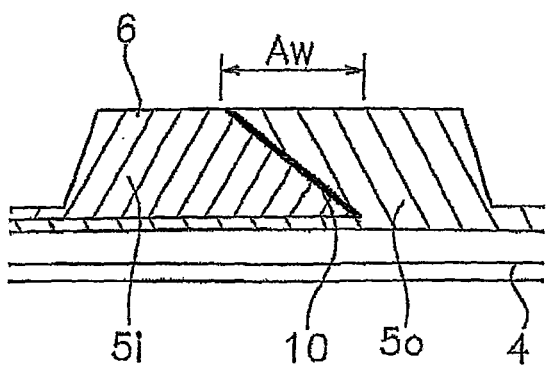
FIG. 7 is a cross sectional view of a center rib according to the other embodiment of the present invention.
Figure 8:
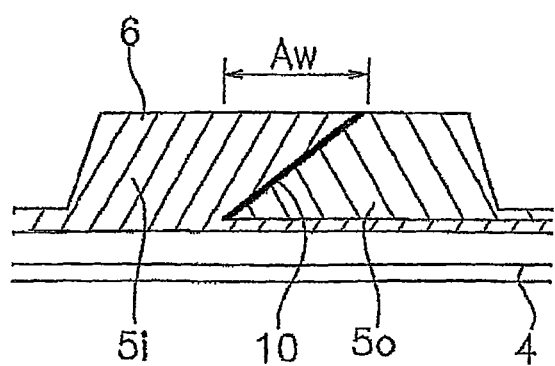
FIG. 8 is a cross sectional view of a center rib according to the other embodiment of the present invention.

(1) In the present invention, as shown in FIG. 6, the outside rubber 5o may be integrated with an inner peripheral side portion of the inside rubber 5i. According to the structure mentioned above, it is possible to well enhance a steering stability at the marginal cornering time at which the severity is comparatively high. The interface region in this interface 10 may be defined as a region having the width Aw. Even in the case where the sloping angle of the interface 10 is inverted as shown in FIG. 7, the same effect can be obtained, and a structure in which the inside rubber 5i is integrated with the inner peripheral side portion of the outside rubber 5o as shown in FIG. 8 may be employed.

Figure 9:
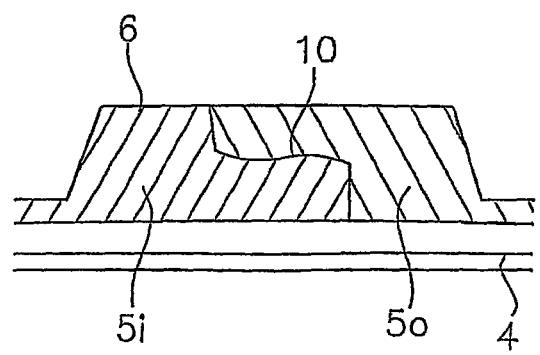
FIG. 9 is a cross sectional view of a center rib according to the other embodiment of the present invention.

(2) FIG. 9 is an example in which the interface 10 is formed as an approximately S-shaped form in a cross section of the tire meridian, and the interface 10 has a bent portion at the midpoint between an outer peripheral end and an inner peripheral end. As shown by FIGS. 4 and 5, the region having the small strain tends to be formed as an approximately S-shaped form, and since the tendency is particularly remarkable as the width of the center rib 6 is enlarged, it is possible to enhance the strain prompting action so as to effectively improve the cornering stability and the braking performance, by setting the interface 10 according to the shape along the lines thereof. Further, this structure is advantageous for securing the bonding region of the interface 10.

(3) It is preferable that a narrow groove (a notch or a slit) and a sipe cutting across the center rib are not formed in the center rib. But, no obstacle is formed even if the narrow groove or the sipe are formed, as long as it neither comparts the center rib nor interfere with the interface.

(4) In the present invention, if the interface as mentioned above is formed in the center rib, the tread rubber may include three kinds or more of rubbers, by setting a division surface in the other land portions other than the center rib.

EXAMPLE

An example tire which concretely shows the structure and effect of the present invention will be explained. An evaluation of each of performances for tire is executed as follows.

(1) Steering Stability

The pneumatic tire was installed to a rim of 19×9J and was filled with a pneumatic pressure in the vicinity of 260 kPa, and a subjective evaluation (on a scale of one to ten) with respect to the lane change stability and the cornering stability was carried out, under a load condition that a driver and the other one (totally two persons) got on an actual car (a domestic 3000 cc car). With regard to the former, a steering property and a response were evaluated at a time of carrying out a lane change travel from a rectilinear travel at 100 to 150 km/h, in a flat straight portion of a high-speed orbiting test course. With regard to the latter, a gripping force and a stability were evaluated at a time of carrying out a high severity travel focusing on a marginal behavior, in a handling test course having a lot of corners which are variously different in their cornering radii. Both are expressed by index numbers in which a related art is set to 100, and the greater numerical value indicates the better performance.

(2) Braking Performance

The pneumatic tire was installed to a rim of 19×9J and was filled with a pneumatic pressure in the vicinity of 260 kPa, a braking distance was measured at a time of slowing down from 100 km/h to 0 km/h on a dry road surface, under a load condition that a driver and the other one (totally two persons) got on an actual car (a domestic 3000 cc car), and an inverse number thereof was calculated. An evaluation is shown by index numbers in which the related art is set to 100, and the greater numerical value indicates the better performance.

In all the test tires of each of the examples, a tire size is 265/35R19 98Y, and has the tire structure as shown in FIG. 1. Only the related art is structured such as to be provided with a single layer tread rubber in which the interface is not formed in the center rib. Further, in the example 3, the interface is formed as an approximately S-shaped form as shown in FIG. 9. Table 1 shows a tension modulus and a rubber hardness of the tread rubber, and respective widths, and Table 2 shows results of evaluation.

TABLE 1

|  | 300% tension modulus (MPa) | | | | rubber hardness (degree) | | | grounding width Cw | rib width Rw | Rw/Cw | interface width Aw | Aw/Rw |
|---|---|---|---|---|---|---|---|---|---|---|---|---|
|  | vehicle outside Mo | vehicle inside Mi | Mo − Mi | (Mo − Mi)/Mo | vehicle outside Ho | vehicle inside Hi | Ho − Hi | | | | | |
| related art | 11.5 | — | — | — | 75 | — | — | 212 | 24 | 11% | — | — |
| example 1 | 11.5 | 7.5 | 4.0 | 35% | 75 | 78 | −3 | 212 | 24 | 11% | 12 | 50% |
| example 2 | 11.5 | 9.5 | 2.0 | 17% | 75 | 73 | 2 | 212 | 24 | 11% | 12 | 50% |
| example 3 | 11.5 | 7.5 | 4.0 | 35% | 75 | 78 | −3 | 212 | 24 | 11% | 12 | 50% |
| comparative example 1 | 9.5 | 11.5 | −2.0 | −21% | 73 | 75 | −2 | 212 | 24 | 11% | 12 | 50% |
| comparative example 2 | 11.5 | 10.5 | 1.0 | 9% | 75 | 74 | 1 | 212 | 24 | 11% | 12 | 50% |
| comparative example 3 | 11.5 | 7.5 | 4.0 | 35% | 75 | 71 | 4 | 212 | 24 | 11% | 12 | 50% |
| comparative example 4 | 11.5 | 7.5 | 4.0 | 35% | 75 | 78 | −3 | 212 | 19 | 9% | 12 | 63% |

TABLE 2

|  | steering stability | | braking performance |
|---|---|---|---|
|  | lane change | cornering | |
| related art | 100 | 100 | 100 |
| example 1 | 100 | 107 | 103 |
| example 2 | 100 | 103 | 101 |
| example 3 | 100 | 110 | 105 |
| comparative example 1 | 100 | 97 | 101 |
| comparative example 2 | 100 | 100 | 100 |
| comparative example 3 | 98 | 107 | 103 |
| comparative example 4 | 95 | 102 | 101 |

In the comparative example 1, since the outside rubber has the lower tension modulus than the inside rubber, the cornering stability cannot be secured. In the comparative example 2, since the tension modulus difference between the outside rubber and the inside rubber is small, it is thought that the strain prompting action in the center rib is not sufficient. In the comparative example 3, since the hardness difference between the outside rubber and the inside rubber is large, the rigidity fluctuation is generated in the center rib, and the lane change stability can not be secured. In the comparative example 4, since the width of the center rib is not sufficiently secured, the lane change stability can not be secured. On the contrary, in the examples 1 to 3, it is possible to achieve the excellent cornering stability and braking performance while securing the lane change stability.

DESCRIPTION OF REFERENCE NUMERALS

1 bead portion
2 side wall portion
3 tread portion
4 carcass layer
5 tread rubber
**5*i*** inside rubber
**5*o*** outside rubber
6 center rib 6C center position
10 interface
Aw width of interface region
Cw grounding width
Rw width of center rib

The invention claimed is:

1. A pneumatic tire comprising a center rib extending along a tire circumferential direction in a center portion of a tread surface, wherein a width of said center rib is equal to or more than 10% of a grounding width, an outside rubber having a relatively high tension modulus is arranged to an outside of a vehicle and an inside rubber having a relatively low tension modulus is arranged to an inside of the vehicle, by setting one and only one interface formed in said center rib along a tire diametrical direction to a boundary, wherein said center rib is divided into two parts in a tire width direction, by setting the single interface to a division surface, wherein at least an outer peripheral portion of the outside rubber on one side of the interface in a tire width direction of said center rib has the relatively high tension modulus and at least an outer peripheral portion of the inside rubber on the other side of the interface in the tire width direction of said center rib has the relatively low tension modulus, wherein at an inner diametrical end of the interface, the interface then extends in a tire axial direction so that an approximately constant thickness of said outside rubber extends axially underneath, and is integrated with an inner peripheral side portion of, said inside rubber, to a position axially beyond the center rib, and wherein 300% tension modulus Mo and a rubber hardness Ho of said outside rubber, and 300% tension modulus Mi and a rubber hardness Hi of said inside rubber satisfy the following relationships:

$(Mo-Mi)/Mo \geq 0.15$ and $Ho-Hi \leq \pm 3$ degree.

2. The pneumatic tire according to claim 1, wherein a center position of said center rib is included in an interface region of said center rib.

3. The pneumatic tire according to claim 1, wherein a width of an interface region of said center rib is equal to or more than 25% of a width of said center rib.

4. The pneumatic tire according to claim 1, wherein the relationship $(Mo-Mi)/Mo \geq 0.25$ is satisfied.

5. The pneumatic tire according to claim 1, wherein the 300% tension modulus Mo of said outside rubber is between 10 and 20 MPa, and the 300% tension modulus Mi of said inside rubber is between 5 and 15 MPa.

6. The pneumatic tire according to claim 1, wherein each of the rubber hardness Ho of said outside rubber and the rubber hardness Hi of said inside rubber is between 70 and 80 degree.

* * * * *